United States Patent
Berthet

(10) Patent No.: US 9,578,020 B2
(45) Date of Patent: Feb. 21, 2017

(54) MODULE FOR CONTROLLING USABILITY OF A DEVICE

(71) Applicant: Sony Corporation, Tokyo (JP)

(72) Inventor: David Berthet, Akarp (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/662,611

(22) Filed: Mar. 19, 2015

(65) Prior Publication Data

US 2016/0277394 A1    Sep. 22, 2016

(51) Int. Cl.
| | |
|---|---|
| H04M 1/66 | (2006.01) |
| H04L 29/06 | (2006.01) |
| G06F 21/88 | (2013.01) |
| H04W 12/12 | (2009.01) |
| H04W 12/06 | (2009.01) |

(52) U.S. Cl.
CPC ........... *H04L 63/0853* (2013.01); *G06F 21/88* (2013.01); *H04W 12/06* (2013.01); *H04W 12/12* (2013.01)

(58) Field of Classification Search
CPC ..... H04L 63/0853; G06F 21/88; H04W 12/12; H04W 12/06
USPC ................. 455/411, 410, 418, 419, 550.1
See application file for complete search history.

(56) References Cited

U.S. PATENT DOCUMENTS

| | | | |
|---|---|---|---|
| 7,454,169 B2 * | 11/2008 | Soerensen | G06F 21/73 455/26.1 |
| 7,873,382 B2 | 1/2011 | Rydgren et al. | |
| 7,975,034 B1 | 7/2011 | Chandra | |
| 8,225,110 B2 * | 7/2012 | Stahl | G06F 21/10 713/189 |
| 8,509,737 B2 | 8/2013 | Cantini et al. | |
| 8,744,403 B2 | 6/2014 | Wu et al. | |
| 8,812,837 B2 * | 8/2014 | McCanna | H04L 9/3268 455/411 |
| 8,819,330 B1 | 8/2014 | Spangler | |
| 9,158,920 B2 | 10/2015 | Zimmer | |

(Continued)

FOREIGN PATENT DOCUMENTS

| | | | | |
|---|---|---|---|---|
| GB | 2445778 A | | 7/2008 | |
| IL | WO 2013095594 A1 * | | 6/2013 | ............. G06F 21/88 |

(Continued)

OTHER PUBLICATIONS

International Search Report and Written Opinion from counterpart International Patent Application No. PCT/EP2015/071490, mailed Dec. 23, 2015.

(Continued)

*Primary Examiner* — Khai M Nguyen

(74) *Attorney, Agent, or Firm* — Tucker Ellis LLP

(57) ABSTRACT

Module (10) for controlling usability of a processing unit (2) of a device (1), the module comprising a modem (11) for communicating with a cellular network, and an access circuit (12) connected to the modem for cellular network authentication and access, which access circuit comprises or is connected to a secure element (12), characterized by a state machine configured to control the device in accordance with one of a plurality of usability states, including at least a normal state and an alert state, wherein operation of the processing unit is inhibited in said alert state.

15 Claims, 3 Drawing Sheets

(56) References Cited

U.S. PATENT DOCUMENTS

| | | |
|---|---|---|
| 9,218,508 B2 | 12/2015 | Wang |
| 9,426,731 B1 * | 8/2016 | Uy .................. H04W 48/18 |
| 2004/0210796 A1 | 10/2004 | Largman |
| 2006/0155988 A1 | 7/2006 | Hunter |
| 2008/0162914 A1 | 7/2008 | Adrangi |
| 2011/0087872 A1 | 4/2011 | Shah |
| 2012/0066546 A1 | 3/2012 | Kim |
| 2012/0124354 A1 | 5/2012 | Batwara |
| 2012/0185933 A1 | 7/2012 | Belk |
| 2012/0233685 A1 | 9/2012 | Palanigounder |
| 2013/0124840 A1 | 5/2013 | Diluoffo |
| 2014/0173268 A1 | 6/2014 | Hashimoto |
| 2014/0273954 A1 * | 9/2014 | Bienas ............. H04W 12/06 455/411 |
| 2014/0274226 A1 * | 9/2014 | Pandya ........... H04W 52/0261 455/574 |
| 2015/0074764 A1 | 3/2015 | Stern |
| 2016/0179554 A1 | 6/2016 | Khosravi |
| 2016/0274920 A1 * | 9/2016 | Berthet ............. G06F 9/4408 |

FOREIGN PATENT DOCUMENTS

| | | |
|---|---|---|
| WO | 2012085593 A1 | 6/2012 |
| WO | 2013/095594 A1 | 6/2013 |
| WO | 2014092385 A | 6/2014 |

OTHER PUBLICATIONS

"TCG MPWG Mobile Reference Architecture. Specification version 1.0 Revision 1", TCG, Jun. 12, 2007, pp. 1-87.
Pending Claims in corresponding U.S. Appl. No. 14/662,596, filed Mar. 19, 2015.

\* cited by examiner

MODULE FOR CONTROLLING USABILITY OF A DEVICE

FIELD OF INVENTION

The present invention relates to a stand-alone module for controlling the usability of a device, and particularly for remotely controlling such a device. More specifically, the module may be connected to impede full operation of a processing unit of such a device.

BACKGROUND

An old problem related to any type of device of value, is the risk of losing the device by accident or by theft. It must often be acknowledged that a lost or stolen device will probably not be returned to its rightful owner as long as the device is fully usable and the identity of the owner is unknown. For articles of manufacture, which are configured to be communicatively connected to a network, such as computers and mobile phones, various suggestions have been made regarding means for overcoming this problem. Most existing protection and tracking solutions are built in as a preventive action that needs to be activated by the user in order to protect the device. Existing password based solutions will protect a device to some extent but can be overcome. Existing tracking solutions using accounts and connectivity are dependent on a lot of prerequisites in order to be operational and effective. Other prior solutions include the following disclosures.

U.S. Pat. No. 8,509,737 describes a security module configured to authenticate a telecommunications network. The security module comprises a locking module for disabling usability of an application module, an unlocking module for re-enabling usability of the application module, and a control module for activating the unlocking module depending on received data that is assignable in an authenticated way to a specific telecommunications network (2).

U.S. Pat. No. 8,812,837 relates to a method that incorporates storing, by a universal integrated circuit card (UICC) including at least one processor, a digital root certificate locking a communication device to a network provider, and disabling an activation of the communication device responsive to receiving an indication of a revocation of the stored digital root certificate from a certificate authority.

WO2012085593 discloses a smartcard embedded or inaccessible within a cellular telecommunications device (eUICC), locked to a particular operator, while allowing the operator to be altered legitimately presents a challenge. A method is described using policy control tables, and by maintaining the policy control table, any operator subscription may be downloaded/activated on the smartcard but the device will be prevented from accessing the desired operator because that access would violate the lock rules.

GB2445778 shows a mobile communication device comprises a memory for storing a unique identifier of the device and a processor for determining the lock status of the device-If the processor determines that the device is unlocked, the device transmits to a server an authorization request to operate in the unlocked mode including the unique identifier of the device. The server compares the unique identifier to unique identifiers of devices stored in a database, each identifier associated with a lock status. The device receives from the server the lock status of the device and controls the operation of the device in dependence upon the determined lock status U.S. Pat. No. 8,744,403 provides a method and system for remote control of a smart card. The method comprises that: a smart card management platform receives a request of locking or unlocking a smart card from a subscriber and the smart card management platform performs interactive processing with a terminal side according to the request via a mobile network platform, so as to enable the terminal side to perform the locking or unlocking of the smart card.

WO2014092385 discloses a method for selecting a specific provisioning profile from among a plurality of provisioning profiles and an apparatus using same. In a terminal to which an eUICC is mounted, the eUICC includes at least one provisioning profile wherein each of the one or more provisioning profile enables a user terminal to communicate with a subscriber management entity supporting at least one network provider. Accordingly, a specific provisioning profile can be selected from among the one or more provisioning profiles, and a network can be connected with a specific mobile communication provider using the selected provisioning profile.

U.S. Pat. No. 7,873,382 describes a mobile communication apparatus that includes a remote lock and control function. After theft or loss of the apparatus, it is possible to remotely lock the apparatus by sending a lock command, e.g. an SMS message. The apparatus may also be controlled to upload information enabling the user to retrieve valuable information stored in the apparatus. The apparatus includes a control unit and registers for controlling the operations of the apparatus, including receiving messages. The apparatus further includes locking means capable of detecting codes in messages received and, responsive to detecting a lock code, sending a lock command to the control unit to render the mobile communication apparatus at least partially inoperable.

SUMMARY OF THE INVENTION

The prior art has thus offered different solutions for protecting mobile terminals, configured to operate in a mobile communications network. However, many devices that are not communication terminals as such may indeed also be susceptible to misplacement or theft. The invention targets the general object of being able to control devices of value, which may include minimizing the risk of losing possession or control of such a device.

According to a first aspect, this is targeted by a module for controlling usability of a processing unit of a device, the module comprising a modem for communicating with a cellular network, and an access circuit connected to the modem for cellular network authentication and access, which access circuit comprises or is connected to a secure element, wherein a state machine is configured to control the device in accordance with one of a plurality of usability states, including at least a normal state and an alert state, wherein operation of the processing unit is inhibited in said alert state.

In one embodiment, the secure element includes a circuit which is non-detachably connected to the processing unit.

In one embodiment, the access circuit forms part of an Embedded Universal Integrated Circuit Card (eUICC).

In one embodiment, the secure element forms part of the eUICC.

In one embodiment, the access circuit forms part of detachable Subscriber Identity Module (SIM) card.

In one embodiment, the module comprises a security domain including applications and registers for setting the usability state of the processing unit.

In one embodiment, the secure element is configured to impede system clock enablement for the processing unit in the alert state.

In one embodiment, the secure element is configured to impede supply voltage to the processing unit in the alert state.

In one embodiment, the security domain is accessible by radio signaling through the modem for setting a usability state.

In one embodiment, the module comprises or is connected to a positioning unit configured to establish a position of the module.

In one embodiment, the module is configured to transmit position data in said alert state.

In one embodiment, the modem, the access circuit and the secure element are provided in a standalone chipset.

In one embodiment, the standalone chipset and the processing unit are carried on a common substrate, wherein the module is connected to selectively impede access to supply voltage or system clock for the processing unit.

In accordance with a second aspect the object is targeted by a method for controlling usability of a processing unit of a device by means of a module comprising a modem for communicating with a cellular network, an access circuit connected to the modem for cellular network authentication and access, a secure element and a state machine, the method comprising the steps of:
at power up of the device, starting the module;
determining, by means of the state machine, a usability state set for the processing unit;
inhibiting operation of the processing unit responsive to determining that the usability state is an alert state.

In one embodiment, the method comprises, after the step of starting the module, the steps of:
establishing a network connection by means of the modem to;
obtaining an online usability state request from the network;
setting the usability state in the secure element in accordance with the request.

BRIEF DESCRIPTION OF THE DRAWINGS

Various embodiments of the invention will be described below with reference to the accompanying drawings, in which.

DETAILED DESCRIPTION OF PREFERRED EMBODIMENTS

In the following description, for purposes of explanation and not limitation, details are set forth herein related to various embodiments. However, it will be apparent to those skilled in the art that the present invention may be practiced in other embodiments that depart from these specific details. In some instances, detailed descriptions of well-known devices, circuits, and methods are omitted so as not to obscure the description of the present invention with unnecessary detail.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and are thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Figure 1:
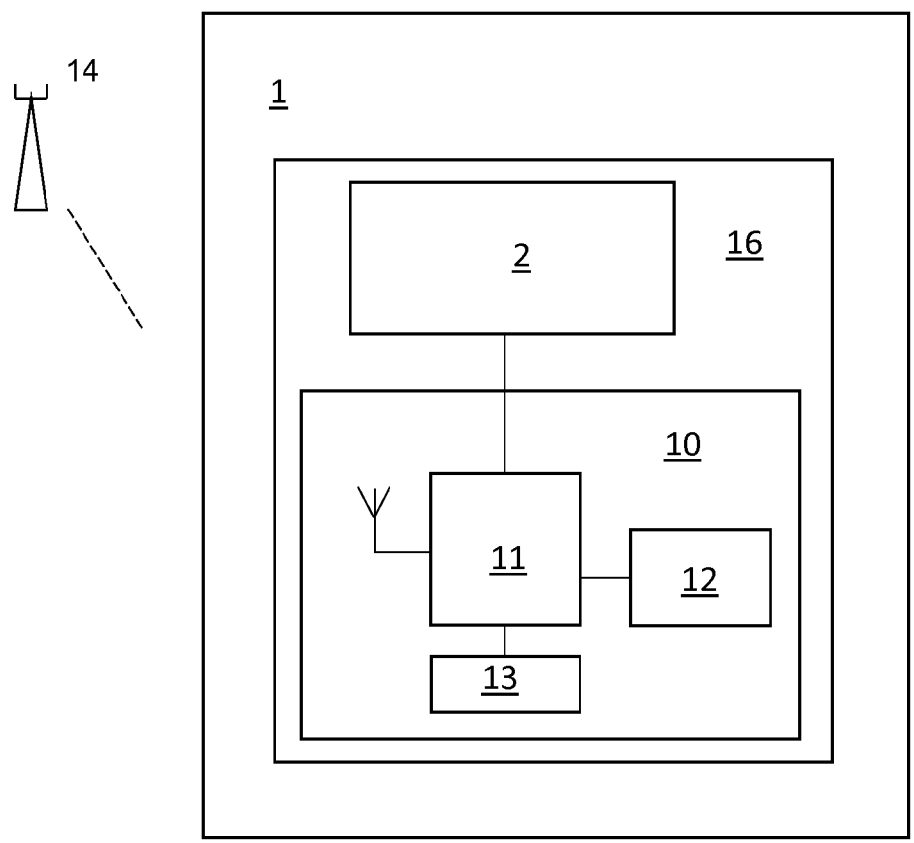
FIG. 1 illustrates a module for controlling usability of a processing unit of a device according to one embodiment.

FIG. 1 illustrates an embodiment of a module 10 for controlling usability of a device 1, which module 10 may be employed for any type of device 1 incorporating a processing unit 2, such as a central processing unit (CPU). The module 10 comprises a modem 11 for communicating with a cellular network, and an access circuit 12 connected to the modem 11 for cellular network authentication and access. The module may include or be connected to an antenna, for radio transmission with a cellular network 14, indicated in FIG. 1 by means of a base station. The access circuit comprises or is connected to a secure element 12, and the secure element 12 incorporates a state machine, effected by executable computer code. The state machine may be configured to control the device in accordance with one of a plurality of usability states, including at least two states. Those states include at least a normal state, which may mean a state in which normal operation of the processing unit 2 of the device 1 is allowed or supported. In addition, the plurality of states include an alert state, in which operation of the processing unit 2 is inhibited. The module 10 is autonomous and operates on its own, meaning that it is not dependent to any other entities, such as the processing unit 2, to become operational.

In one embodiment, the secure element includes a circuit which is non-detachably connected to the processing unit. The secure element circuit may be soldered to a common circuit board at the processing unit. In an alternative arrangement, the secure element circuit may be provided on a circuit card, which is non-detachably secured in a card reader, which card reader is mechanically connected to the processing unit.

In a preferred embodiment that will be outlined herein, the access circuit forms part of an Embedded Universal Integrated Circuit Card (eUICC) 12. Also the secure element preferably forms part of the eUICC 12. In this respect, it may be noted that one and the same type of hardware circuit may e.g. be flashed to act as an UICC, or simply as an eSE, which may be decided by choice of implementation. In an alternative arrangement, a separate embedded secure element (eSE) may be employed, which has a secure element circuit that is separate from the eUICC. In another embodiment, in which such a separate eSE provides the secure element circuit, may be combined with a standard detachable Subscriber Identity Module (SIM) card, which provides the access circuit.

The embedded eUICC 12 is preferably compliant with a standard for provisioning over-the-air, and holds at least a security domain with cellular network access capabilities. The security domain, alternatively referred to as a root security domain, includes the necessary applications and the registers to manage and maintain the state of the module in terms of usability of a device 1, in other words a state machine. The range of states allowed is defined upon the choice of implementation. As a strict minimum, an alert and a normal state need to be defined. When the state machine of the eUICC is set in alert state the device 1 is not operable unless an alert is resolved and the device 1 goes back to the normal operation as under normal state, as defined by the implementation. The exact definition of operability may be defined through the choice of implementation, but an alert state shall mean that the device 1 cannot be used as intended and that the necessary measures have been implemented to avoid unauthorized change of state.

Figure 2:
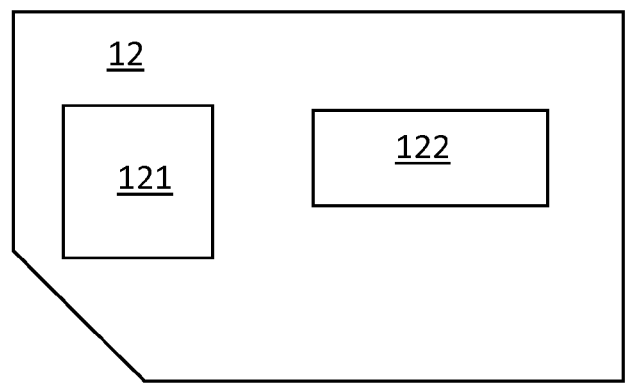
FIG. 2 schematically illustrates an access circuit and a secure element, formed on a common carrier according to one embodiment.

FIG. 2 schematically illustrates a combined access circuit and secure element in the form of an UICC 12. This UICC may e.g. be an eUICC, or e.g. a UICC that in other ways has been non-detachably connected to the modem 11, and in turn to the processing unit 2 of a device 1 under control. The eUICC comprises circuits and memory means configured to store program code forming eUICC operating software (OS) 121. The eUICC OS 121 is configured to implement alert management, integrated with domain management of the eUICC. For this purpose, the eUICC 12 comprises a root security domain 122. The embedded UICC shall not allow the root security domain 122 to be deleted but other security domains can be installed and activated in case the device integrates cellular connectivity in its primary definition, meaning that the device itself already includes a modem. In case of alert, the eUICC OS 121 must secure that the alert event is provided to the root security domain responsible for state control.

In accordance with a preferred embodiment, once an authenticated alert is received by the embedded UICC, the root security domain 122 will perceive the alert in order to perform usability control of the device 1 the module 10 is connected to. In one embodiment, the module always starts with the root security domain 122 and may switch to a user domain once the usability state, i.e. normal state, has been determined.

The module 1 is remotely accessible over the cellular network and the state of the eUICC is remotely controllable by an authenticated remote service. The authenticated remote service shall be allowed to query the state of the eUICC 12 and request a change of state.

The module is configured to control the operability of the processing unit 2 of a device by for example controlling the enablement of a system clock or a supply voltage of the processing unit 2. This control may be executed digitally by means of a data setting or signal connected to the processing unit 2. In an alternative embodiment, control may be executed by means of a signal switch, controlled by the module 10 to selectively allow or inhibit a signal or power to the processing unit 2. In case the module is in an alert state, operability of the processing unit is inhibited or completely disabled and the device cannot be started to become operable. In case an alert is received while the device is fully operational, the module is set in an alert state and shall shutdown immediately. Dependent on choice of implementation, the device 1 may be configured to perform tracking to send its position to the network and simply switch off, or it may enter a low power tracking mode to constantly report state and position to an authenticated remote service. In such an embodiment, the module 10 may include a positioning unit 13, e.g. a GPS receiver. Obtained position information, and potentially other information related to the device may, upon agreement, be forwarded to an authenticated owner or authorities.

Alerts can be triggered both from an authenticated service on the device itself or be broadcast from an authenticated remote service over the cellular network but can preferably only be resolved remotely. This allows the implementation of self-request mechanisms where the device itself requests a change of state. In such an embodiment, a state change request event may be self-triggered. It may e.g. be dependent on time, such as a self-lock timer or even be the default state at power up. Alternatively, or in combination, position of the device, as determined by positioning unit 13, may act as a trigger for the module 10 to go to alert mode. Alternatively, or in combination, the module 10 could be set in alert when manufactured and remotely unlocked when sold. In yet another alternative embodiment, an alert state may be ordered by default when the device is turned off, such that it is always started in alert state.

In a preferred embodiment, the module 10 is provided as a standalone chipset, comprising a modem 11 and an eUICC 12, and potentially a positioning unit 13. In one embodiment the standalone chipset may be supported on a common substrate 16, such as a PCB, as the processing unit 2. The module 10 and the processing unit 2 are then connected on the PCB 16 such that the module 10 is capable of inhibiting proper operation of the processing unit 2, e.g. by being able to disconnect access to supply voltage or to a system clock signal.

Figure 3:
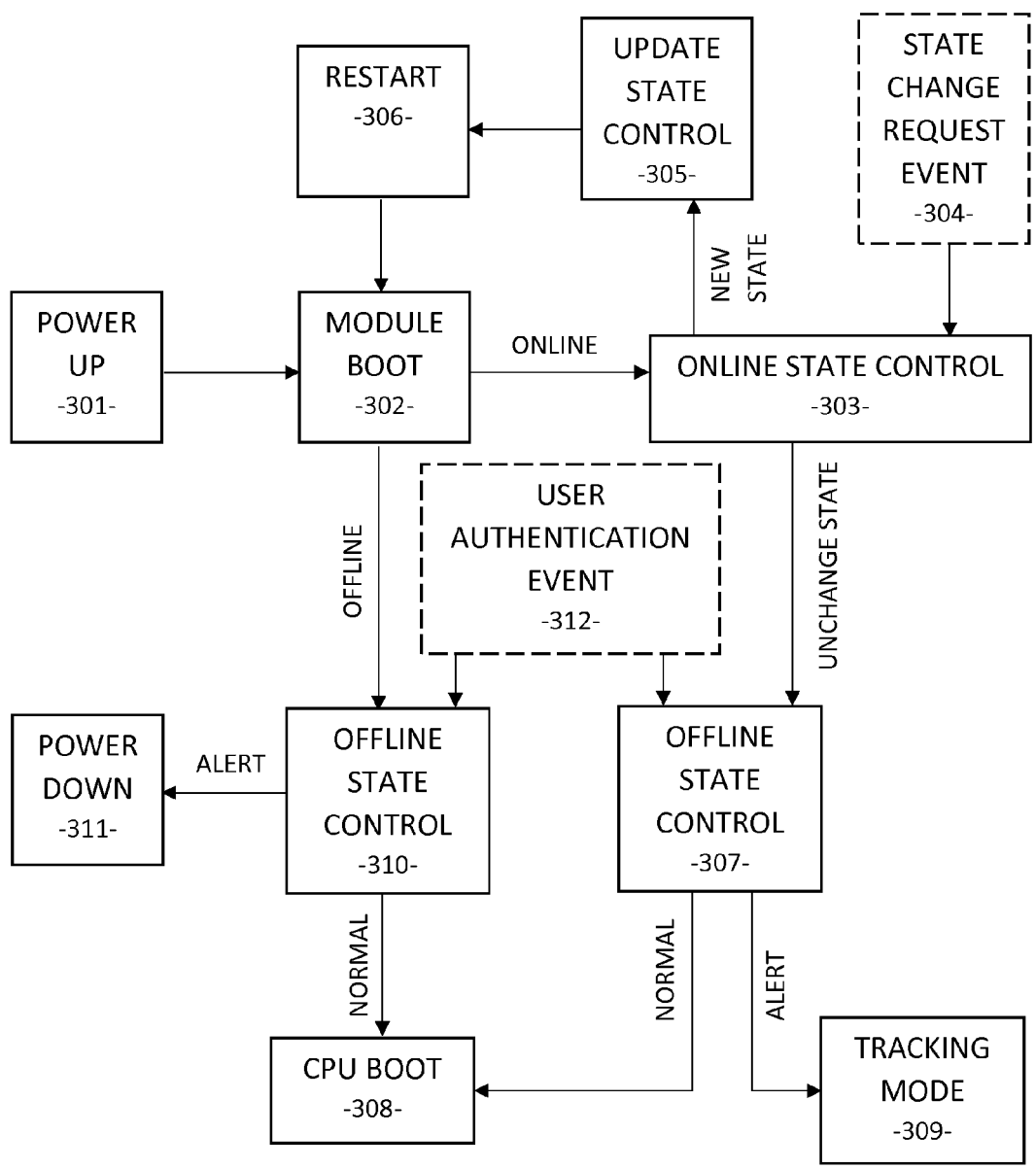
FIG. 3 schematically illustrate a flow chart for a process for operating the embodiment of FIG. 1 and to according to one embodiment.

FIG. 3 schematically shows a flow diagram representing an embodiment for control of a device 1 by means of a module 10 comprising a modem 11, an access circuit and a secure element, e.g. provided on an eUICC 12.

Power up 301 is typically initiated by a user, e.g. by pushing a button on the device 1 in question. When the device incorporates a module in accordance with the embodiments described herein, the first thing that occurs upon power up is that the module is booted 302, i.e. both the secure element 12, e.g. an eUICC, and the modem 11.

If the modem 11 is capable of going online, an online state control 303 is performed. This may be accomplished by actually transmitting a page signal to the cellular network in which the module 10 is set to operate, so as to trigger a state signal 304 to be sent back to the module 10. In an alternative embodiment, the module may simply be configured to listen to or measure a predetermined signal 304 or data value 304 in a signal, which is broadcast in the serving network, so as to determine whether or not there is any present state change request. The determination of whether a state change request event has occurred may require further steps. As an example, information received from the network may indicate a new location rule, and position data may thus have to be obtained from a positioning unit 13 in the module 10 before determining whether there is an actual state change event or not. In this step 303, access is typically also given to a pre-stored offline state value.

If a certain new state has been determined in stage 303, the state engine of the security domain is updated in 305, where after the module is restarted 306 and the module is again booted 302.

If, at the online state control stage 303 it is determined that there is no state change event, the state machine of the module 10 is configured to operate in accordance with its pre-stored offline data at 307. If the offline state is normal, the module will proceed to allow boot of the processing unit 2 of the device 1 at 308, after which operation of the device will continue uninhibited. If, on the other hand, the pre-stored offline state is set to alert, the module may be configured to go to a tracking mode 309, by operating a positioning unit 13. In one embodiment, this may include allowing the processing unit 2 to boot, and for the module 10 to collect positioning data in stealth mode, and reporting it to the network. In another embodiment, tracking mode 309 is entered without boot of the processing unit. The device 1 is thereby rendered useless, or at least with inhibited operation characteristics.

In the event that the module 10 is not capable of going online at boot 302, the module is configured to operate under offline state control 310. This entails checking state information stored in the root domain, and continuing accordingly. In one embodiment, the state machine is configured such that if it is impossible to connect to the network and go online, the module shall power down 311. In another embodiment, an actual pre-stored state may be recorded in the root domain, e.g. from the last time the module was powered up. In yet another embodiment, a pre-stored default value may be dependent on location as well, as already described.

If the offline state control results in the state being determined to be normal, the processing unit 2 is booted 308 and operation of the device 1 is allowed. If, on the other hand, it is determined that alert state is present, the module may be configured to power down 311.

When the processing unit has been booted 308 and the device 1 is operational, the module 10 will continue to monitor state change request events 304, either as received from the network, or occurring for other reasons, e.g. triggered by time and or position.

In case the device is set in alert mode offline, it shall preferably be possible to change the offline state after proper user authentication 312. This may e.g. be done wirelessly, e.g. by NFC if an NFC receiver is contained in the module 10 (not shown), through galvanic contact with a bus, or by input on a user interface, such as a touch screen.

FIG. 4 illustrate an embodiment for the example of a module 10 for protecting full operability of a device 1 by radio control. This is obtained by means of the modem 11 and the eUICC 12 of the module 10, connected to a processing unit 2 of the device 1 under control. The module may take the form of the embodiments described with reference to FIGS. 1 and 2, although certain details are left out in FIG. 4 for the sake of simplicity, such as the optional common substrate 16.

Figure 4A:
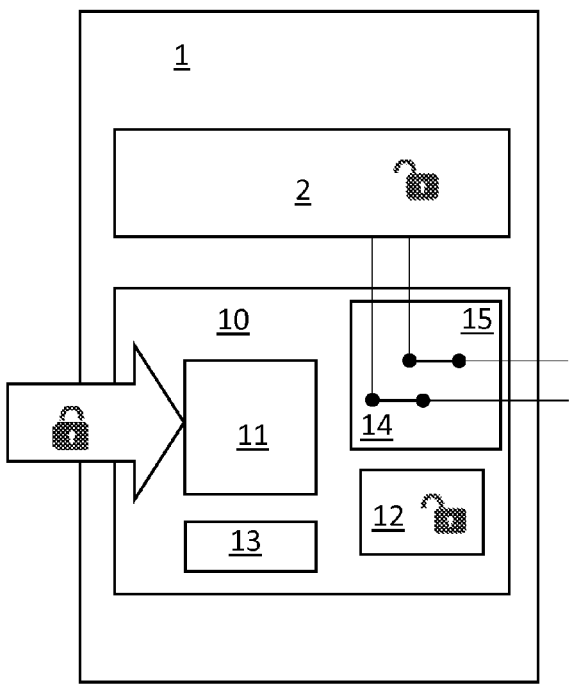
FIGS. 4A and B illustrates the process of controlling usability of a device in an alert state.

In FIG. 4A, a secure element OS 121 of the eUICC 12 may be configured to run in accordance with a normal state, e.g. in an open domain using an active service provider profile, with a certain set of applications and data. As such, the module 10 is configured to receive state request signals conveyed by radio over a cellular network. In this normal state, the device processing unit 2 is fully operative, or at least not inhibited by means of the module 10. The arrow symbolizes an incoming network lock request, and in this embodiment that state request signal comprises data which is interpreted in the module 10 as an alert state request. This data may be encoded information, or simply a signal of predetermined character that is recognized in the module to have the meaning of an alert request signal.

When the modem receives and interprets the lock request, this will have effect on the module 10 itself, and on the device 1 it is set to control. The module 10 is configured to switch from the active service provider domain to the root domain 122, responsive to the alert state request. Alternatively, if only the root domain 122 exists, that root domain 122 is set to a security mode in which it acts as a state machine.

Figure 4B:
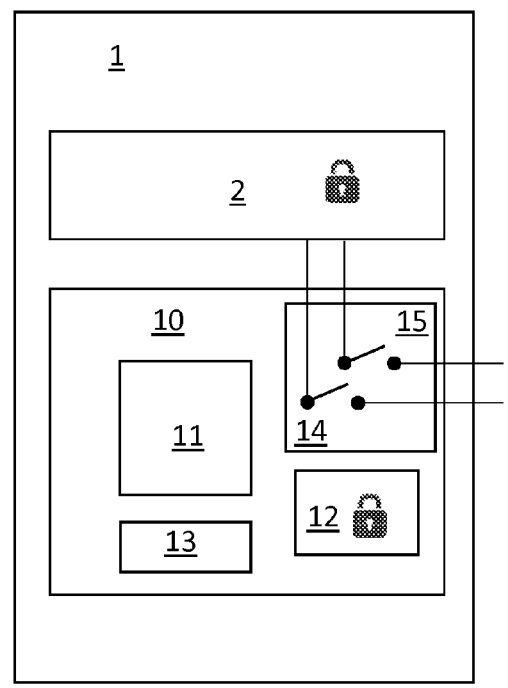

FIG. 4B illustrates how the module 10 operating in the root security domain has activated the alert state, by inhibiting operation of the device processing unit 2. In one embodiment this may be realized by denying or interfering access to a system clock 14 for the processing unit 2, or to the required supply voltage 15 for the processing unit 2, or both.

Unlocking of a device 1 may be executed by changing from an alert state to a normal state. This is preferably obtained by sending a state request signal through a network, comprising data which is interpreted in the module 10 as a normal state request. A normal state request may be received via radio through the modem 11, similar to the scenario of FIG. 4A. Such an unlock request will cause unlocking of the eUICC, and subsequently the unlocked eUICC will operate to switch the state machine from alert state to normal state for control of the device 1. In this process, full operability of the processing unit is preferably allowed. The eUICC 12 and the modem 10 are then preferably rebooted, so as to enable a selected active profile.

Embodiments of the invention have been discussed in the foregoing on a general level, and with respect to certain embodiments. The module 10 may be configured for use to control different types of devices 1, such as e.g. a car, a camera, a computer, a television set etc., even if that device itself does not incorporate cellular network capabilities. The embodiment described have in common that the network control of the module is separate from the operation of the device as such, whereas control of the device 1 in different states may involve inhibiting full operability of a processing unit of the device. The skilled person will realize that where not contradictory, the disclosed embodiments above may be combined in various combinations.

The invention claimed is:

1. A device comprising a module for controlling usability of a processing unit of the device, wherein the module comprises a modem that communicates with a cellular network, and an access circuit connected to the modem that carries out cellular network authentication and access, wherein the module operates independently of a processing unit of the device, and wherein the module is configured to:
   become active, upon the startup of the device, and before the processing unit of the device becomes active;
   determine, before the processing unit of the device becomes active, one of a plurality of usability states, including at least a normal state and an alert state; and
   upon determination of the alert state, electrically inhibit operation of the processing unit.

2. The device of claim 1, wherein the access circuit comprises a secure element, and wherein the secure element includes a circuit which is non-detachably connected to the processing unit.

3. The device of claim 1, wherein the access circuit forms part of an Embedded Universal Integrated Circuit (eUIC).

4. The device of claim 3, wherein the access circuit comprises a secure element, and wherein the secure element forms part of the eUIC.

5. The device of claim 2, wherein the access circuit forms part of a detachable Subscriber Identity Module (SIM) card.

6. The device of claim 1, comprising a security domain including applications and registers for setting the plurality of usability states.

7. The device of claim 1, wherein the access circuit comprises a secure element, wherein the secure element is responsible for electrically inhibiting the operation of the processing unit, and wherein the secure element electrically inhibits the operation of the processing unit by preventing access by the processing unit to a system clock for the processing unit.

8. The device of claim 1, wherein the access circuit comprises a secure element, wherein the secure element is responsible for electrically inhibiting the operation of the processing unit, and wherein the secure element electrically inhibits the operation of the processing unit by preventing access by the processing unit to a supply voltage for the processing unit.

9. The device of claim 6, wherein the security domain is accessible by radio signaling through the modem for setting a usability state.

10. The device of claim 1, wherein the module comprises a positioning unit configured to establish a position of the module.

11. The device of claim 10, wherein the module is configured to transmit position data in said alert state.

12. The device of claim 1, wherein the modem, the access circuit and a secure element are provided in a standalone chipset.

13. The device of claim 12, wherein the standalone chipset and the processing unit are carried on a common substrate, and wherein the module is connected to selectively electrically inhibit operation of the processing unit by preventing access to the processing unit to a supply voltage or a system clock for the processing unit.

14. A method for controlling usability of a processing unit of a device, the method carried out by a module comprising a modem for communicating with a cellular network, and an access circuit connected to the modem for cellular network authentication and access, wherein the module operates independently of the processing unit of the device, the method comprising the steps of:
  activating the module at power up of the device, and before the processing unit of the device becomes active;
  determining, before the processing unit of the device becomes active, a usability state set for the processing unit; and
  electrically inhibiting operation of the processing unit responsive to determining that the usability state is an alert state.

15. The method of claim 14, further comprising the steps of:
  establishing, via the module, a network connection by means of the modem;
  obtaining an online usability state request from the network, via the established network connection; and
  prior to the determining, setting the usability state in the secure element in accordance with the request.

* * * * *